US012019597B1

(12) United States Patent
George et al.

(10) Patent No.: US 12,019,597 B1
(45) Date of Patent: Jun. 25, 2024

(54) DEDUPLICATION OF RECORDS IN LARGE DATABASES VIA CLUSTERING

(71) Applicant: Coupa Software Incorporated, San Mateo, CA (US)

(72) Inventors: Rojit George, Dombivli (IN); Henry Backman, Basel (CH)

(73) Assignee: Coupa Software Incorporated, San Mateo, CA (US)

( * ) Notice: Subject to any disclaimer, the term of this patent is extended or adjusted under 35 U.S.C. 154(b) by 0 days.

(21) Appl. No.: 18/191,549

(22) Filed: Mar. 28, 2023

(51) Int. Cl.
| | | |
|---|---|---|
| G06F 16/00 | (2019.01) | |
| G06F 16/215 | (2019.01) | |
| G06F 16/23 | (2019.01) | |
| G06F 16/248 | (2019.01) | |
| G06F 16/28 | (2019.01) | |

(52) U.S. Cl.
CPC ........ *G06F 16/215* (2019.01); *G06F 16/2379* (2019.01); *G06F 16/248* (2019.01); *G06F 16/285* (2019.01)

(58) Field of Classification Search
CPC .. G06F 16/215; G06F 16/2379; G06F 16/248; G06F 16/285
See application file for complete search history.

(56) References Cited

U.S. PATENT DOCUMENTS

| | | | | |
|---|---|---|---|---|
| 8,838,549 | B2 * | 9/2014 | Bodapati | G06F 16/215 |
| | | | | 707/737 |
| 9,922,113 | B2 * | 3/2018 | Seiver | G06F 16/2228 |
| 10,169,169 | B1 * | 1/2019 | Shaikh | G06F 11/2094 |
| 11,314,782 | B2 * | 4/2022 | Lindner | G06F 16/2465 |

(Continued)

FOREIGN PATENT DOCUMENTS

| | | |
|---|---|---|
| CA | 2627936 A1 | 5/2007 |
| EP | 3133511 A1 | 2/2017 |

(Continued)

*Primary Examiner* — Noosha Arjomandi
(74) *Attorney, Agent, or Firm* — Baker Botts L.L.P.

(57) ABSTRACT

A computer-implemented method, comprising: using a normalization service of a first application virtual compute instance hosted in and executing in a cloud computing facility, accessing a plurality of digitally stored data records of a transaction processing system, each of the data records comprising a plurality of data values for a corresponding plurality of attributes; using the normalization service, executing a data cleaning operation on the data records by programmatically calling two or more data cleaning functions, each of the data cleaning functions corresponding to a particular attribute among the plurality of attributes; using the normalization service, creating and storing a plurality of clusters in memory of the first application virtual compute instance by clustering the data records based on exact matches of the data values of a first attribute and creating and storing references to the data records in the clusters; using the normalization service, joining two or more clusters among the plurality of the clusters in the memory to produce two or more joined clusters based on matches of most common values in the data records referenced in the plurality of clusters; updating the data records by adding cluster identifiers of the joined clusters.

18 Claims, 7 Drawing Sheets

(56) References Cited

U.S. PATENT DOCUMENTS

| | | | |
|---|---|---|---|
| 11,762,859 B2* | 9/2023 | Sun | G06F 16/2228 |
| | | | 707/769 |
| 2005/0182780 A1* | 8/2005 | Forman | G06F 16/215 |
| 2010/0023515 A1 | 1/2010 | Marx | |
| 2014/0032556 A1 | 1/2014 | Bayliss | |
| 2015/0278258 A1* | 10/2015 | Kienzle | G06F 3/0484 |
| | | | 707/692 |
| 2017/0242868 A1* | 8/2017 | Doan | G06F 16/215 |
| 2018/0113928 A1 | 4/2018 | Oberhofer et al. | |
| 2018/0203916 A1* | 7/2018 | Rafsky | G06F 16/285 |
| 2019/0361621 A1* | 11/2019 | S | G06F 3/067 |
| 2021/0026820 A1* | 1/2021 | Mahajan | G06F 16/316 |
| 2021/0026821 A1* | 1/2021 | Glidden | H04L 63/0414 |
| 2021/0326311 A1* | 10/2021 | Ker | G06F 21/602 |
| 2021/0406285 A1 | 12/2021 | Vo et al. | |
| 2022/0237707 A1* | 7/2022 | Hosoai | G06F 16/215 |
| 2023/0177029 A1* | 6/2023 | David | G06F 16/27 |
| | | | 707/692 |
| 2023/0195735 A1* | 6/2023 | Al-Qurishi | G06F 16/2255 |
| | | | 707/728 |

FOREIGN PATENT DOCUMENTS

| | | | |
|---|---|---|---|
| WO | 2009087138 A1 | 7/2009 | |
| WO | 2011146420 A1 | 11/2011 | |

* cited by examiner

DEDUPLICATION OF RECORDS IN LARGE DATABASES VIA CLUSTERING

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright or rights whatsoever. © 2022-2023 Coupa Software Incorporated.

TECHNICAL FIELD

One technical field of the present disclosure is digital electronic transaction processing systems that use large databases of digitally stored records that may contain duplication. Another technical field is computer-implemented methods of deduplication, record clustering, and normalization.

BACKGROUND

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

Online, real-time, multi-tenant transaction processing systems have become widely available and now see daily use by tens of thousands of enterprises. One class of transaction processing systems is used in enterprise procurement or e-procurement, in which buyer computers associated with buyer enterprises use the systems as a mediating platform to plan, initiate, and conduct transactions with suppliers. These systems commonly offer large scale and can accommodate tens of thousands of buyers and millions of transactions with tens of thousands of suppliers.

Buyer computers, when configuring a transaction such as a purchase order, requisition, or sourcing event, commonly identify or name and create records for the suppliers who will supply the goods or services in the transaction. When a buyer enterprise has numerous buyer representatives all interacting with the system, a lack of knowledge, desire for speed, or other factors can lead multiple different buyer representatives to create and store records for the same supplier, using names or identifiers that are similar but not identical. Furthermore, each enterprise or customer entity working with the platform, or each instance of the platform for a customer, maintains an independent supplier data table of supplier records. Consequently, data tables of an instance or the entire system can become cluttered with supplier records having substantially duplicate data, which consumes excess storage and requires excess CPU cycles to resolve conflicts, locate and select the correct record, and generate reports.

Based on the foregoing, the referenced technical fields have developed an acute need for better ways to remove or consolidate duplicate supplier records. One requirement to address this need is improved ways to perform supplier normalization by clustering similar supplier records together for analysis, inspection, consolidation, or deletion of one or more records.

SUMMARY

The appended claims may serve as a summary of the invention.

DETAILED DESCRIPTION

Figure 1A:
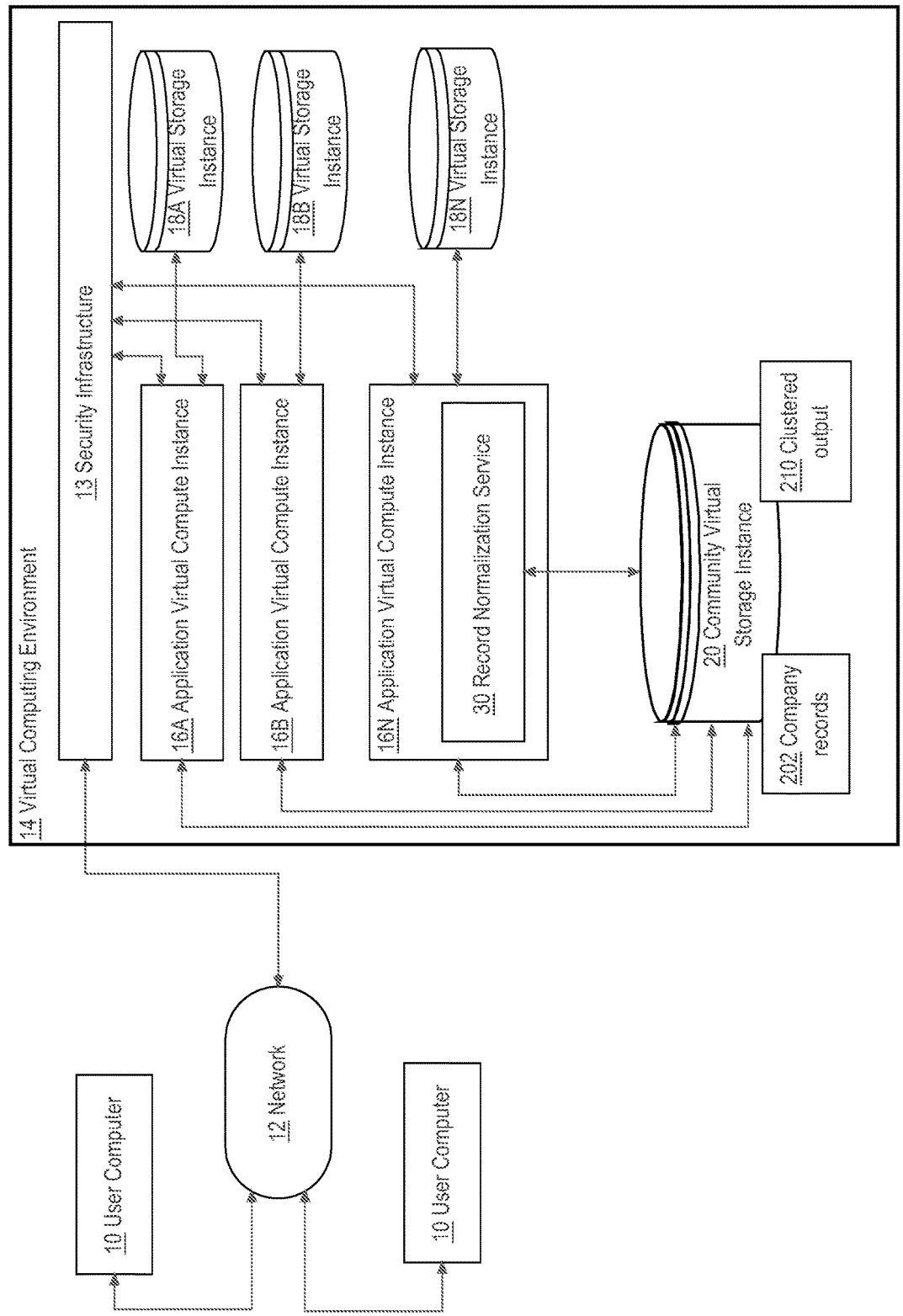
FIG. 1A illustrates a distributed computer system showing the context of use and principal functional elements with which one embodiment could be implemented.

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

The text of this disclosure, in combination with the drawing figures, is intended to state in prose the algorithms that are necessary to program the computer to implement the claimed inventions, at the same level of detail that is used by people of skill in the arts to which this disclosure pertains to communicate with one another concerning functions to be programmed, inputs, transformations, outputs and other aspects of programming. That is, the level of detail set forth in this disclosure is the same level of detail that persons of skill in the art normally use to communicate with one another to express algorithms to be programmed or the structure and function of programs to implement the inventions claimed herein.

One or more different inventions may be described in this disclosure, with alternative embodiments to illustrate examples. Other embodiments may be utilized and structural, logical, software, electrical, and other changes may be made without departing from the scope of the particular inventions. Various modifications and alterations are possible and expected. Some features of one or more of the inventions may be described with reference to one or more particular embodiments or drawing figures, but such features are not limited to usage in the one or more particular embodiments or figures with reference to which they are described. Thus, the present disclosure is neither a literal description of all embodiments of one or more of the inventions nor a listing of features of one or more of the inventions that must be present in all embodiments.

Headings of sections and the title are provided for convenience but are not intended as limiting the disclosure in any way or as a basis of interpreting the claims. Devices that are described as in communication with each other need not be in continuous communication with each other, unless expressly specified otherwise. In addition, devices that are in communication with each other may communicate directly or indirectly through one or more intermediaries, logical or physical.

A description of an embodiment with several components in communication with one other does not imply that all such components are required. Optional components may be described to illustrate a variety of possible embodiments and to more fully illustrate one or more aspects of the inventions. Similarly, although process steps, method steps, algorithms or the like may be described in a sequential order, such processes, methods and algorithms may generally be configured to work in different orders, unless specifically stated to the contrary. Any sequence or order of steps described in this disclosure is not a required sequence or order. The steps of described processes may be performed in any order practical. Further, some steps may be performed simultaneously. The illustration of a process in a drawing does not exclude variations and modifications, does not imply that the process or any of its steps are necessary to one or more of the invention(s), and does not imply that the illustrated process is preferred. The steps may be described once per embodiment, but need not occur only once. Some steps may be omitted in some embodiments or some occurrences, or some steps may be executed more than once in a given embodiment or occurrence. When a single device or article is described, more than one device or article may be used in place of a single device or article. Where more than one device or article is described, a single device or article may be used in place of the more than one device or article.

The functionality or the features of a device may be alternatively embodied by one or more other devices that are not explicitly described as having such functionality or features. Thus, other embodiments of one or more of the inventions need not include the device itself. Techniques and mechanisms described or referenced herein will sometimes be described in singular form for clarity. However, it should be noted that particular embodiments include multiple iterations of a technique or multiple manifestations of a mechanism unless noted otherwise. Process descriptions or blocks in figures should be understood as representing modules, segments, or portions of code which include one or more executable instructions for implementing specific logical functions or steps in the process. Alternate implementations are included within the scope of embodiments of the present invention in which, for example, functions may be executed out of order from that shown or discussed, including substantially concurrently or in reverse order, depending on the functionality involved.

1. GENERAL OVERVIEW

Embodiments provide computer-implemented methods of deduplicating transaction records, such as records of suppliers in e-procurement systems. Certain embodiments implement advanced data cleaning functions in combination with a scalable and expandable clustering algorithm that combines clusters based on their matching, most-common values. Embodiments also can encompass the subject matter of the following numbered clauses:

1. A computer-implemented method, comprising: using a normalization service of a first application virtual compute instance hosted in and executing in a cloud computing facility, accessing a plurality of digitally stored data records of a transaction processing system, each of the data records comprising a plurality of data values for a corresponding plurality of attributes; using the normalization service, executing a data cleaning operation on the data records by programmatically calling two or more data cleaning functions, each of the data cleaning functions corresponding to a particular attribute among the plurality of attributes; using the normalization service, creating and storing a plurality of clusters in memory of the first application virtual compute instance by clustering the data records based on exact matches of the data values of a first attribute and creating and storing references to the data records in the clusters; using the normalization service, joining two or more clusters among the plurality of the clusters in the memory to produce two or more joined clusters based on matches of most common values in the data records referenced in the plurality of clusters; updating the data records by adding cluster identifiers of the joined clusters.
2. The computer-implemented method of clause 1, wherein the first application virtual compute instance is communicatively coupled to a first virtual storage instance that hosts a community database, the method further comprising: executing, in the cloud computing facility, a plurality of second application virtual compute instances corresponding to a plurality of different tenants of the transaction processing system, each second application virtual compute instance among the plurality of second application virtual compute instances being communicatively coupled to a particular virtual storage instance among a plurality of virtual storage instances in the cloud computing facility, each of the virtual storage instances being configured to store instance-specific data corresponding to a particular tenant of the corresponding second application virtual compute instance; using the first virtual compute instance, querying each of the virtual storage instances among a plurality of virtual storage instances to obtain the instance-specific data of all the tenants; using the first virtual compute instance, combining and storing copies of the instance-specific data corresponding to the tenants in company records of the community database.
3. The computer-implemented method of clause 1, wherein the updating comprises adding a cluster identifier column attribute to the data records and storing the cluster identifiers in the cluster identifier column attribute.
4. The computer-implemented method of clause 1, the transaction processing system comprising an e-procurement system, the data records comprising supplier records, each of the supplier records having the data values for at least a supplier name attribute, a tax identifier attribute, an email address attribute.
5. The computer-implemented method of clause 4, further comprising, using the normalization service, executing the data cleaning operation on the data records by programmatically calling a supplier name cleaning function that is programmed to clean data values of the supplier name attribute, programmatically calling a tax identifier cleaning function that is programmed to clean data values of the tax identifier attribute, and programmatically calling an email address cleaning function that is programmed to clean data values of the email address attribute.
6. The computer-implemented method of clause 4, further comprising: using the normalization service, executing the data cleaning operation on the data records by programmatically calling a supplier name cleaning function that is programmed to clean data values of the supplier name attribute and programmatically calling a tax identifier cleaning function that is programmed to clean data values of the tax identifier attribute; using the normalization service, executing an invalid value filtering operation on the data records to remove at least invalid values of the tax identifier value.

7. The computer-implemented method of clause 6, further comprising, using the normalization service, executing the invalid value filtering operation on the data records to remove at least invalid values of the tax identifier value via frequency analysis and identifying outliers.

8. The computer-implemented method of clause 1, further comprising, using the normalization service, joining the two or more clusters among the plurality of the clusters in the memory to produce the two or more joined clusters based on matches of the top-N most common values in the data records referenced in the plurality of clusters, where N is between "1" and "5".

9. The computer-implemented method of clause 2, further comprising: using the normalization service, updating the data records and the joined clusters in the community database; using a supplier search service executed using the first virtual compute instance, receiving a search query that specifies a target supplier name; using the supplier search service, executing the search query against the community database to return a result set comprising the data records referenced in a particular joined cluster that matches the search query; using the supplier search service, formatting and transmitting, to a user computer, presentation instructions which when rendered using the user computer cause displaying the data values of the attributes of the data records referenced in a particular joined cluster that matches the search query.

10. One or more non-transitory computer-readable storage media storing one or more sequences of instructions which, when executed using one or more processors, cause the one or more processors to execute: using a normalization service of a first application virtual compute instance hosted in and executing in a cloud computing facility, accessing a plurality of digitally stored data records of a transaction processing system, each of the data records comprising a plurality of data values for a corresponding plurality of attributes; using the normalization service, executing a data cleaning operation on the data records by programmatically calling two or more data cleaning functions, each of the data cleaning functions corresponding to a particular attribute among the plurality of attributes; using the normalization service, creating and storing a plurality of clusters in memory of the first application virtual compute instance by clustering the data records based on exact matches of the data values of a first attribute and creating and storing references to the data records in the clusters; using the normalization service, joining two or more clusters among the plurality of the clusters in the memory to produce two or more joined clusters based on matches of most common values in the data records referenced in the plurality of clusters; updating the data records by adding cluster identifiers of the joined clusters.

11. The one or more non-transitory computer-readable storage media of clause 10, wherein the first application virtual compute instance is communicatively coupled to a first virtual storage instance that hosts a community database, and further comprising one or more sequences of instructions which, when executed using the one or more processors, cause the one or more processors to execute: executing, in the cloud computing facility, a plurality of second application virtual compute instances corresponding to a plurality of different tenants of the transaction processing system, each second application virtual compute instance among the plurality of second application virtual compute instances being communicatively coupled to a particular virtual storage instance among a plurality of virtual storage instances in the cloud computing facility, each of the virtual storage instances being configured to store instance-specific data corresponding to a particular tenant of the corresponding second application virtual compute instance; using the first virtual compute instance, querying each of the virtual storage instances among a plurality of virtual storage instances to obtain the instance-specific data of all the tenants; using the first virtual compute instance, combining and storing copies of the instance-specific data corresponding to the tenants in company records of the community database.

12. The one or more non-transitory computer-readable storage media of clause 10, wherein the instructions for the updating further comprise one or more sequences of instructions which, when executed using the one or more processors, cause the one or more processors to execute adding a cluster identifier column attribute to the data records and storing the cluster identifiers in the cluster identifier column attribute.

13. The one or more non-transitory computer-readable storage media of clause 10, the transaction processing system comprising an e-procurement system, the data records comprising supplier records, each of the supplier records having the data values for at least a supplier name attribute, a tax identifier attribute, an email address attribute.

14. The one or more non-transitory computer-readable storage media of clause 13, further comprising one or more sequences of instructions which, when executed using the one or more processors, cause the one or more processors to execute, using the normalization service, executing the data cleaning operation on the data records by programmatically calling a supplier name cleaning function that is programmed to clean data values of the supplier name attribute, programmatically calling a tax identifier cleaning function that is programmed to clean data values of the tax identifier attribute, and programmatically calling an email address cleaning function that is programmed to clean data values of the email address attribute.

15. The one or more non-transitory computer-readable storage media of clause 13, further comprising one or more sequences of instructions which, when executed using the one or more processors, cause the one or more processors to execute: using the normalization service, executing the data cleaning operation on the data records by programmatically calling a supplier name cleaning function that is programmed to clean data values of the supplier name attribute and programmatically calling a tax identifier cleaning function that is programmed to clean data values of the tax identifier attribute; using the normalization service, executing an invalid value filtering operation on the data records to remove at least invalid values of the tax identifier value.

16. The one or more non-transitory computer-readable storage media of clause 15, further comprising one or more sequences of instructions which, when executed using the one or more processors, cause the one or more processors to execute, using the normalization service, executing the invalid value filtering operation on the data records to remove at least invalid values of the tax identifier value via frequency analysis and identifying outliers.

17. The one or more non-transitory computer-readable storage media of clause 10, further comprising one or more sequences of instructions which, when executed using the one or more processors, cause the one or more processors to execute, using the normalization service, joining the two or more clusters among the plurality of the clusters in the memory to produce the two or more joined clusters based on matches of the top-N most common values in the data records referenced in the plurality of clusters, where N is between "1" and "5".

18. The one or more non-transitory computer-readable storage media of clause 11, further comprising one or more sequences of instructions which, when executed using the one or more processors, cause the one or more processors to execute: using the normalization service, updating the data records and the joined clusters in the community database; using a supplier search service executed using the first virtual compute instance, receiving a search query that specifies a target supplier name; using the supplier search service, executing the search query against the community database to return a result set comprising the data records referenced in a particular joined cluster that matches the search query; using the supplier search service, formatting and transmitting, to a user computer, presentation instructions which when rendered using the user computer cause displaying the data values of the attributes of the data records referenced in a particular joined cluster that matches the search query.

2. STRUCTURAL & FUNCTIONAL OVERVIEW

2.1 Distributed Computer System Example

FIG. 1A illustrates a distributed computer system showing the context of use and principal functional elements with which one embodiment could be implemented. In an embodiment, a computer system comprises components that are implemented at least partially by hardware at one or more computing devices, such as one or more hardware processors executing stored program instructions stored in one or more memories for performing the functions that are described herein. In other words, all functions described herein are intended to indicate operations that are performed using programming in a special-purpose computer or general-purpose computer, in various embodiments. FIG. 1 illustrates only one of many possible arrangements of components configured to execute the programming described herein. Other arrangements may include fewer or different components, and the division of work between the components may vary depending on the arrangement.

FIG. 1A, and the other drawing figures and all of the description and claims in this disclosure, are intended to present, disclose and claim a technical system and technical methods in which specially programmed computers, using a special-purpose distributed computer system design, execute functions that have not been available before to provide a practical application of computing technology to the problems of normalization, clustering, and identifying duplicate records in large-scale databases. In this manner, the disclosure presents a technical solution to a technical problem. The applicant disclaims any intent based on, or interpretation of, the disclosure or claims to cover any judicial exception to patent eligibility, such as an abstract idea, mental process, method of organizing human activity or mathematical algorithm. Any interpretation of the disclosure or claims to cover any judicial exception to patent eligibility, such as an abstract idea, mental process, method of organizing human activity or mathematical algorithm, has no support in this disclosure and is intended to have no support in this disclosure, and is not a reasonable interpretation and/or would be erroneous.

Figure 4:
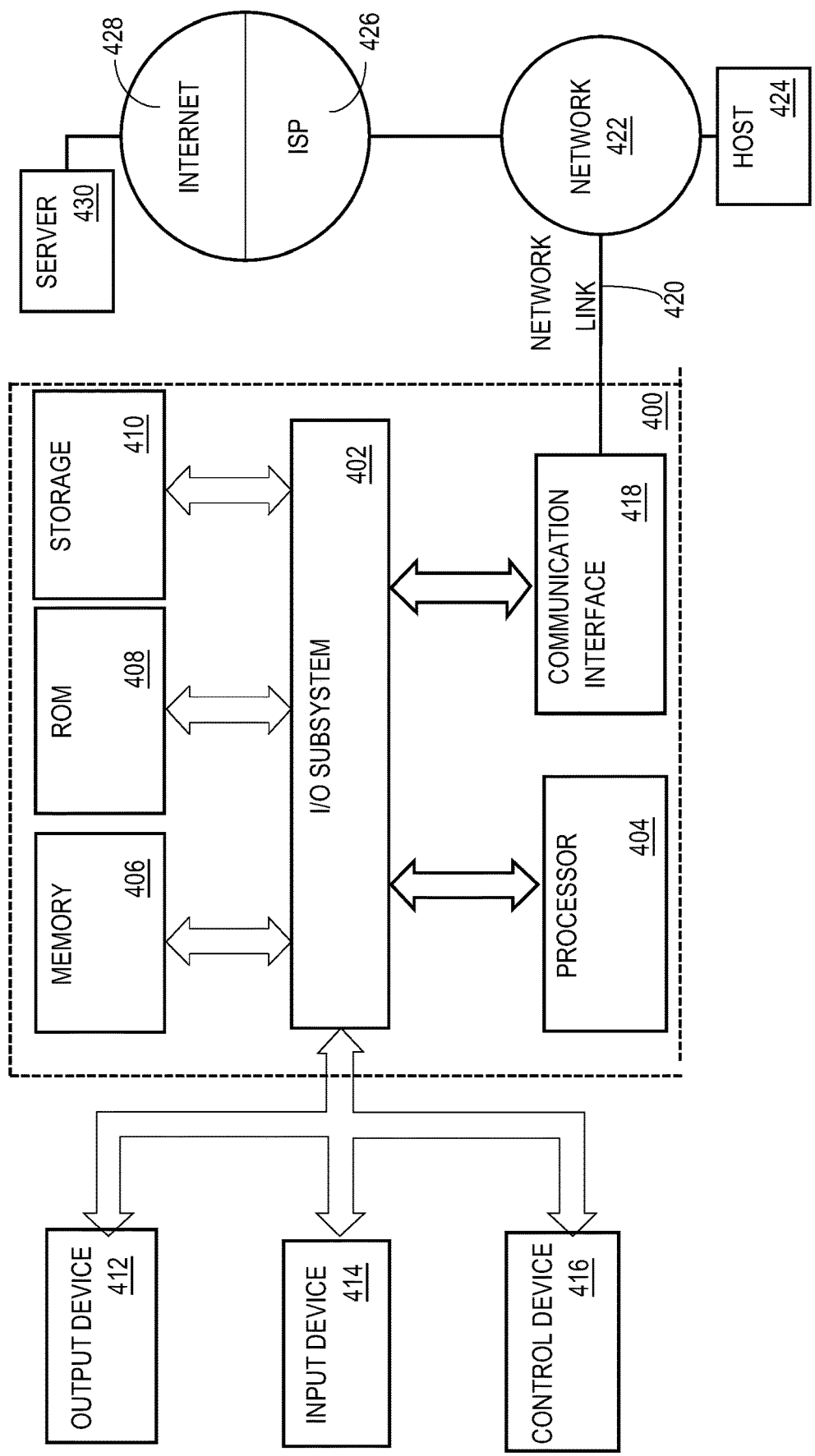
FIG. 4 illustrates an example computer system with which one embodiment could be implemented.

In an embodiment, a plurality of user computers 10 are communicatively coupled directly or indirectly via one or more networks 12 to a virtual computing environment 14. Each of the user computers 10 can comprise any of a laptop computer, desktop or tower computer, workstation, netbook computer, tablet computer, smartphone, or other mobile computing device. Typically, each of the user computers 10 hosts or executes an operating system and application programs including an internet browser. The architecture of FIG. 4 can be used for any of the user computers 10. For purposes of illustrating a clear, uncluttered example, FIG. 1A shows two (2) user computers 10 but practical embodiments can include thousands to millions of user computers.

Network 12 broadly represents one or more local area networks, wide area networks, campus networks, and/or internetworks using any of terrestrial or satellite, wired or wireless network links.

Virtual computing environment 14 can comprise a private data center or a public or contracted data center, such as an online cloud computing facility. In an embodiment, virtual computing environment 14 comprises security infrastructure 13, such as one or more firewall routers, gateways, security appliances, and/or load balancers that route, switch, and/or bridge network traffic from network 12 to one or more application virtual compute instances 16A, 16B, 16N, with N indicating that any number of such instances can be provided. In one embodiment, each of the application virtual compute instances 16A, 16B, 16N is associated with a different enterprise or legal entity having a customer-service provider relationship to an owner or operator of the application virtual compute instances 16A, 16B, 16N. Thus, each of the application virtual compute instances 16A, 16B, 16N can comprise a copy or duplicate instance of a software-based, SaaS-based application server, such as an e-procurement system or other transaction processing system.

In an embodiment, each of the application virtual compute instances 16A, 16B, 16N is communicatively coupled to a corresponding virtual storage instance 18A, 18B, 18N, each of which can be programmed according to a table schema and implement a relational database, object database, flat file system or other form of online digital data storage. In some embodiments, each of the virtual storage instances 18A, 18B, 18N is concurrently hosted using a single multi-tenant relational database or physical digital data storage system that uses software security controls to segregate data of different tenants and bar one tenant from accessing or updating data of another, different tenant.

In an embodiment, one of the application virtual compute instances 16N hosts or executes a record normalization server 30, comprising one or more sequences of stored program instructions that are programmed to execute the functions that are described in other sections herein to perform record normalization, deduplication, and/or clustering.

In an embodiment, the application virtual compute instance 16N and the record normalization service 30 are communicatively coupled to and/or have online programmatic digital access to a community virtual storage instance 20, which is programmed with a table schema to digitally store at least a first table of company records 202 and a second table of clustered output 210, which are further described in other sections. Thus, in this embodiment, a first application virtual compute instance can be communicatively coupled to a first virtual storage instance that hosts a community database. In a cloud computing facility, a plurality of second application virtual compute instances execute, and correspond to a plurality of different tenants of the transaction processing system. Each second application virtual compute instance among the plurality of second application virtual compute instances is communicatively coupled to a particular virtual storage instance among a plurality of virtual storage instances in the cloud computing facility. Each of the virtual storage instances is configured to store instance-specific data corresponding to a particular tenant of the corresponding second application virtual compute instance. In an embodiment, the first virtual compute instance can be programmed to periodically query each of the virtual storage instances among a plurality of virtual storage instances to obtain the instance-specific data of all the tenants, and to combine and store copies of the instance-specific data corresponding to the tenants in company records of the community database. The programmatic compilation of community data in this manner can occur periodically in different periods depending on the computing power of the environment; example periods include daily or nightly, weekly, monthly, and quarterly.

In an embodiment, enterprises or entities that are associated with the application virtual compute instances 16A, 16B have consented to data sharing agreements with a service provider, which can be the owner or operator of the elements shown within virtual computing environment 14. Under the data sharing agreements, the application virtual compute instances 16N has legal and/or contract authorization to obtain data for a plurality of different tenants from the virtual storage instances 18A, 18B, 18N and to contribute copies of records from those instances, or modified records that use values of one or more attributes of those records, to the community virtual storage instance 20. Anonymization or de-identification algorithms can be implemented to cause the community virtual storage instance 20 store only de-identified records that cannot be associated with a particular tenant.

In an embodiment, the application virtual compute instances 16A, 16B are communicatively coupled within the virtual computing environment 14 to the community virtual storage instance 20, or to applications of the application virtual compute instance 16N that use the community virtual storage, to perform applications other than record normalization, such as analytics, recommendations, benchmarking, and calculation of key performance indicators (KPIs) for a community of multiple tenants or for one tenant in comparison to the community data represented in the community virtual storage instance 20. Thus, record normalization service 30 can be implemented as one service among multiple different services, microservices, and/or applications that use community data derived from tenant-specific data for different purposes, calculations, applications, or results.

For example, clustered supplier records based on community data can be integrated into a supplier search service or application as follows. Using the normalization service 30, the data records and the joined clusters are updated in a community database such as the company records. Using a supplier search service executed using a first virtual compute instance of FIG. 1B, the supplier search service is programmed to receive from one of the user computers 10 a search query that specifies a target supplier name. For example, the application virtual compute instance 16A could implement a search service to support an e-procurement application and could be programmed to transmit presentation instructions to a user computer 10 to cause displaying a graphical user interface with a search box GUI widget to search for a supplier. Input using the user computer 10 into the GUI widget could cause transmitting the search query to the application virtual compute instance 16A and the search service. In response, the supplier search service can be programmed to execute the search query against the community database to return a result set comprising the data records referenced in a particular joined cluster that matches the search query. Exact matching, fuzzy matching, or other query matching techniques can be used to identify and return a cluster having a cluster name, or a record in the cluster, that best matches the search query. The records referenced in that cluster then become the basis of presenting search results to the user computer 10. For example, the supplier search service could be programmed for formatting and transmitting, to a user computer, presentation instructions which when rendered using the user computer cause displaying the data values of the attributes of the data records referenced in a particular joined cluster that matches the search query. This technique effectively reduces the search space that a query must address, especially when the query is matched to a cluster name, rather than matched to every record referenced in all clusters. In this manner, the data cleaning, invalid value filtering, and clustering techniques described in other sections are integrated into the practical application of improved computer-based database search systems.

2.2 Example Data Processing Flows

Figure 1B:
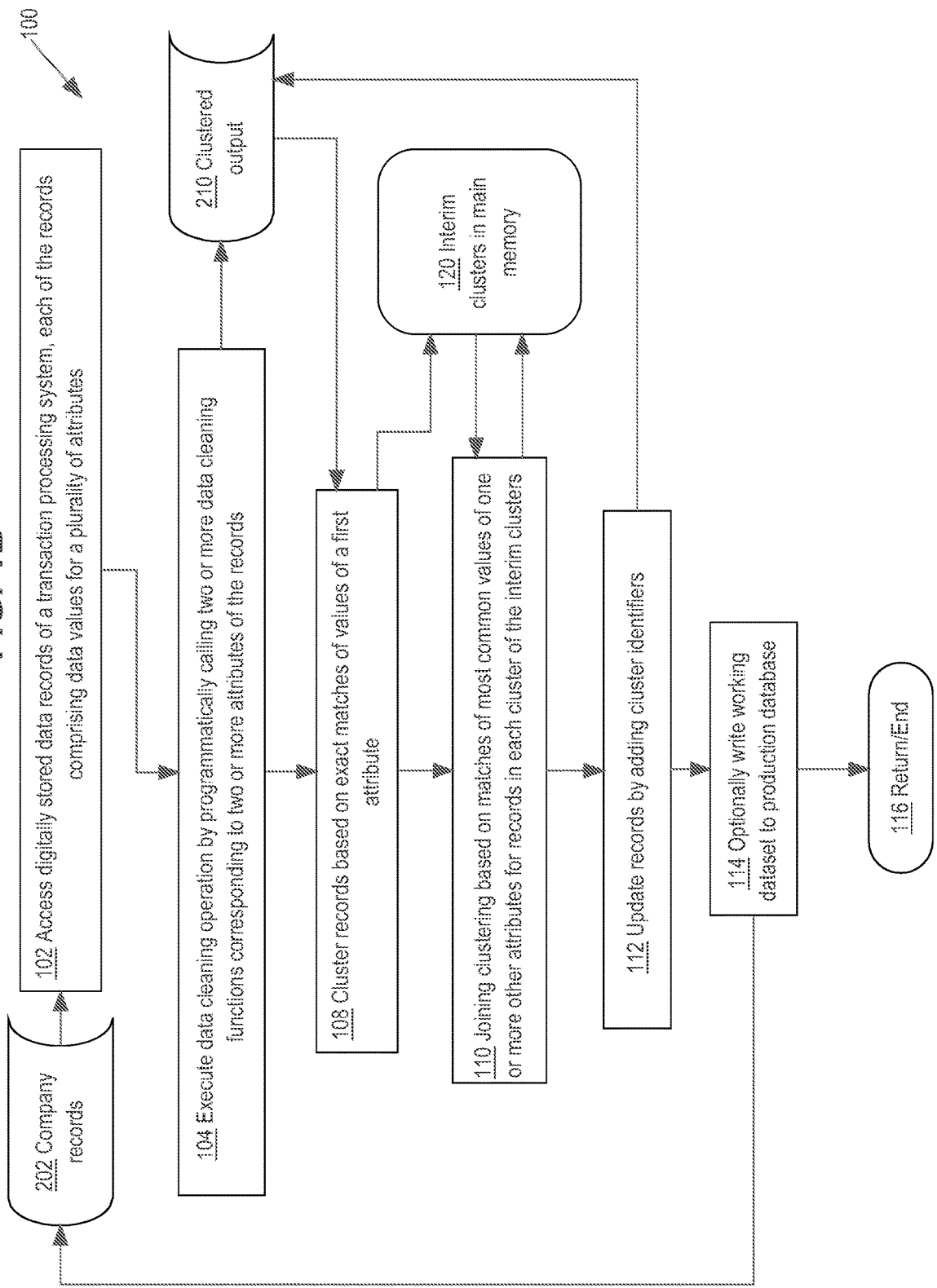
FIG. 1B illustrates an example process of creating and storing digitally stored records in which similar supplier records are clustered.
Figure 2:
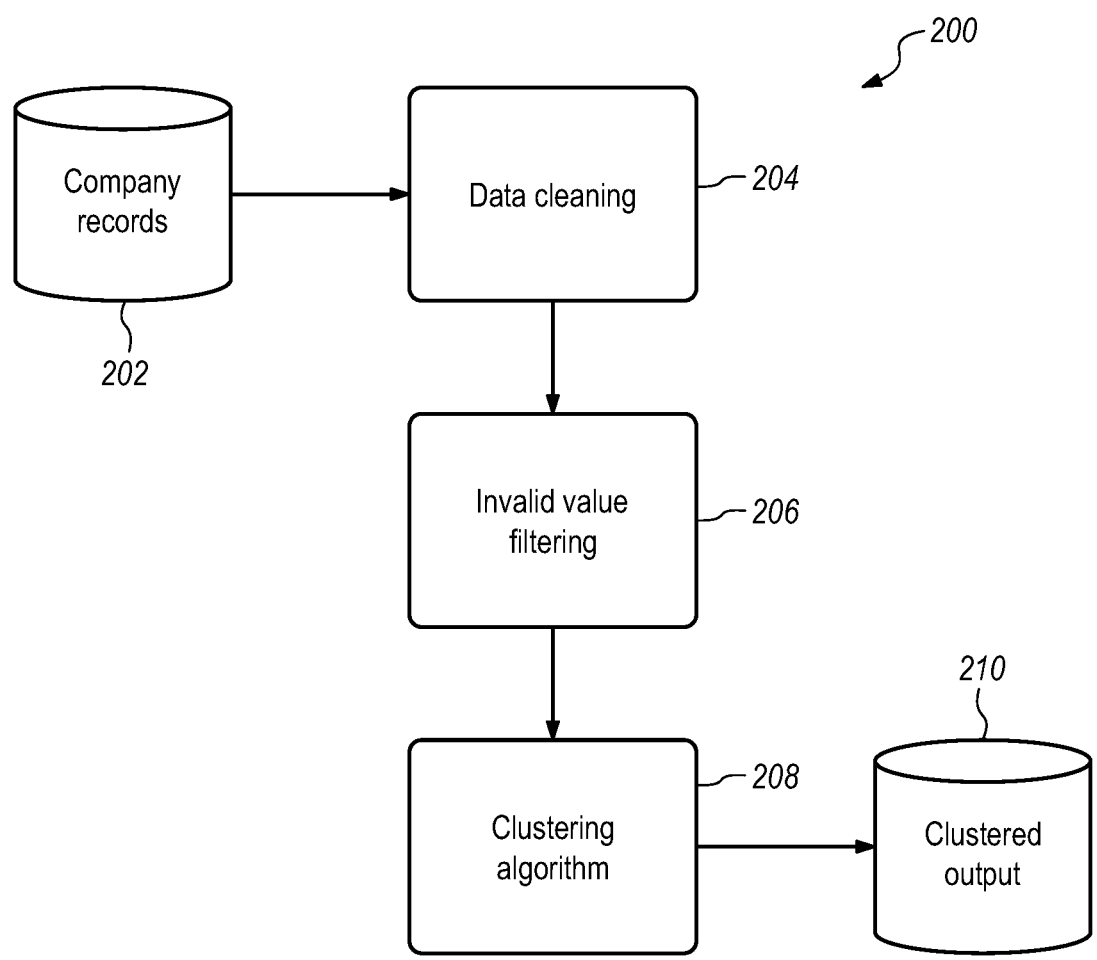
FIG. 2 illustrates an example process of creating and storing digitally stored records in which similar supplier records are clustered.
Figure 3A:
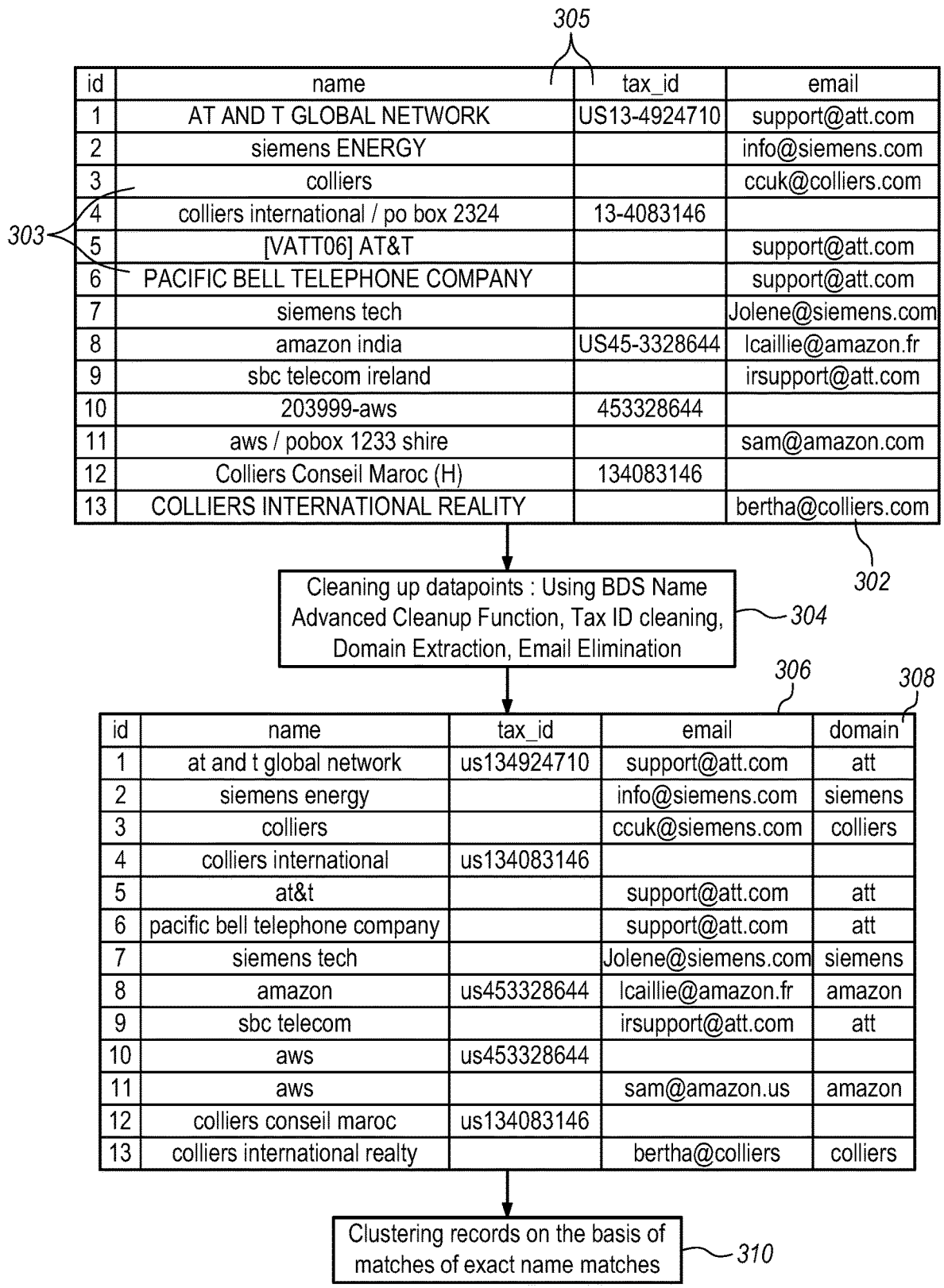
FIG. 3A and FIG. 3B each illustrates hypothetical tables of supplier records, selected steps of an example process for clustering the supplier records, and the effects of applying certain steps.
Figure 3B:
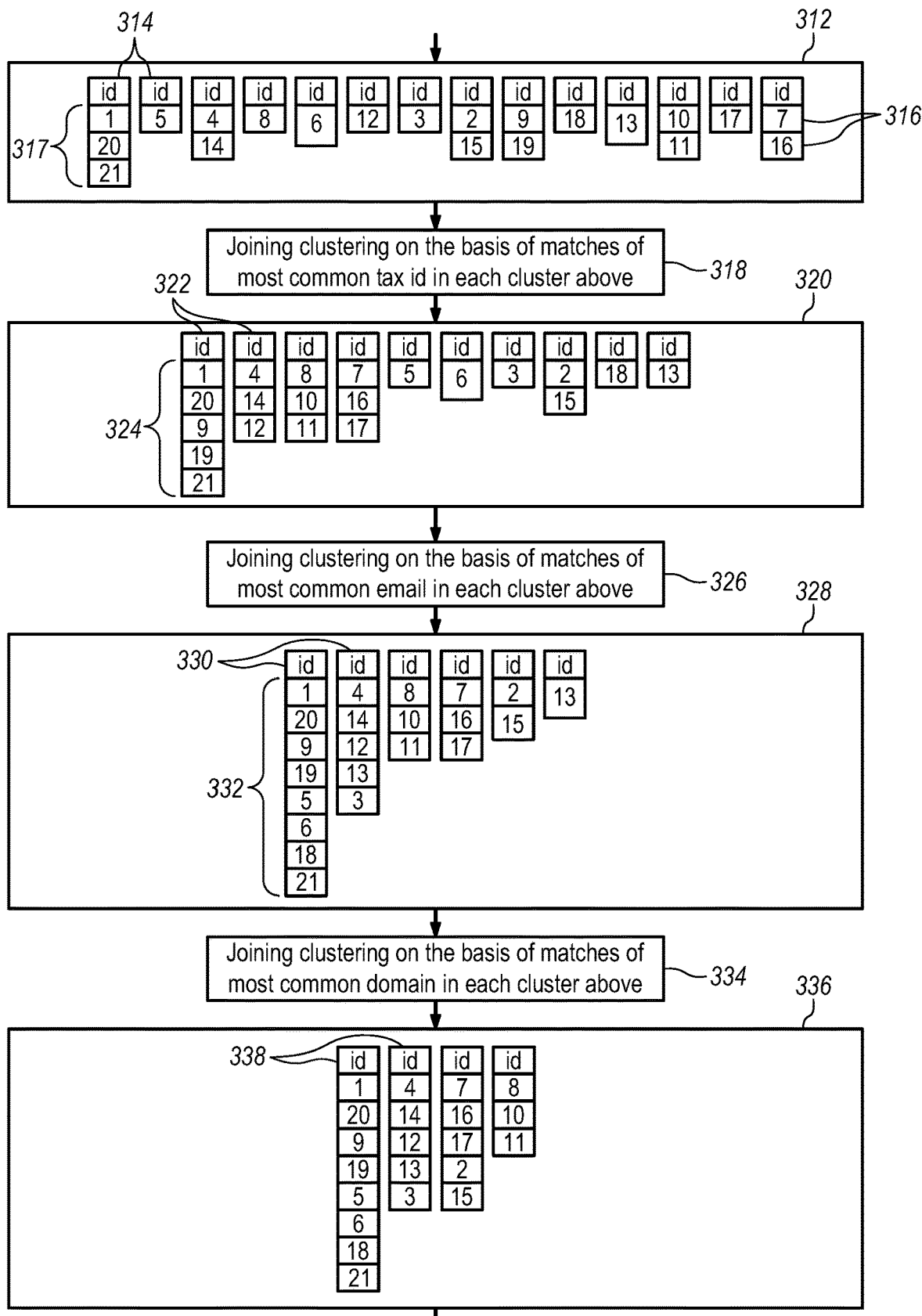
Figure 3B:
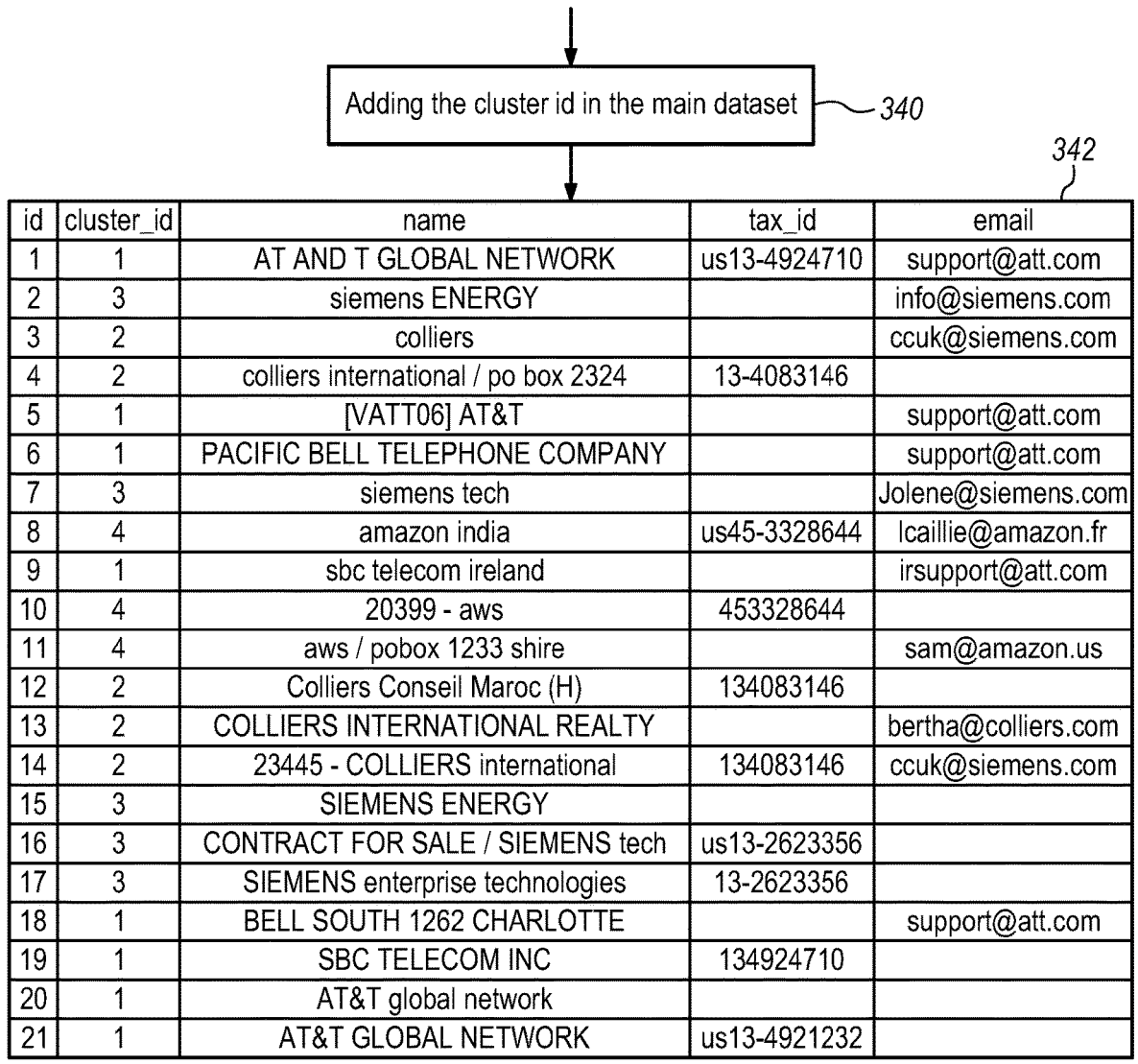

FIG. 1B illustrates an example process of creating and storing digitally stored records in which similar supplier records are clustered. FIG. 2 illustrates an example process of creating and storing digitally stored records in which similar supplier records are clustered. FIG. 3A and FIG. 3B each illustrates hypothetical tables of supplier records, selected steps of an example process for clustering the supplier records, and the effects of applying certain steps. FIG. 1B, FIG. 2, and each other flow diagram herein are intended as an illustration at the functional level at which skilled persons, in the art to which this disclosure pertains, communicate with one another to describe and implement algorithms using programming. The flow diagrams are not intended to illustrate every instruction, method object or sub-step that would be needed to program every aspect of a working program, but are provided at the same functional level of illustration that is normally used at the high level of skill in this art to communicate the basis of developing working programs.

Certain embodiments are useful in supplier normalization, although the broad techniques of this disclosure can be applied to the de-duplication of records not relating to suppliers. In an embodiment, the record normalization service 30 (FIG. 1A) implements the functions shown in FIG. 1B, FIG. 2 to perform supplier normalization in an online, SaaS-based, e-procurement platform that includes the elements of virtual computing environment 14. In one embodiment, supplier normalization refers to clustering supplier company records to facilitate identifying duplicate records in a database that identify the same entity. In an embodiment, clustering is based upon obtaining values for a plurality of attributes of the data records and determining whether the values for the same attributes of multiple records are similar. Example attributes for suppliers include name, website, tax ID, and address. Attributes for records other than suppliers can be different. The inventors have noted from experimentation and experience that when the same tax ID appears in two records with different names, the tax ID value is a strong indicator that the records refer to the same entity; however, tax ID has been observed to suffer from data quality issues that are addressed in this disclosure.

Certain benefits of the present approaches can be understood by considering examples of other approaches for deduplication. In one approach, a process is programmed to find records that have a matching value in one or more of the foregoing attributes and to add those records to a cluster. However, when poor data quality is present, such an approach will not accurately classify records. TABLE 1 shows a hypothetical example table of data records:

TABLE 1

EXAMPLE VALUES OF TWO
ATTRIBUTES OF A SET OF DATA RECORDS

| Name | Tax ID |
|---|---|
| COUPA SOFTWARE INC | 1111 |
| EXT SUPPLIER-COUPA | 1111 |
| ACME SOFTWARE INC | 1111 |
| AMERICAN TRANSFER CO | 2222 |
| AMERICAN TRANSFER CO INC | 3333 |
| AMERICAN TRANSFER SHIPPING | 4444 |

Based solely on matching values of the Tax ID attribute, the foregoing approach would incorrectly cluster the record for ACME SOFTWARE INC with the COUPA records. Incorrect Tax ID values occur in transaction records, including supplier records, frequently.

Name fields present a separate problem; a common issue is that the format of the name does not match on a character-by-character basis, although human inspection indicates a similarity. For example, in TABLE 1, the records for COUPA SOFTWARE INC and EXT SUPPLIER—COUPA obviously refer to the same company, but ACME SOFTWARE INC does not. Open-source software is available to calculate similarity metrics for two names, and that software could be adapted to score name values in records and use the score values to determine clusters. However, the inventors' experience is that many records have incorrect values with more similarity than correct ones, so fuzzy matching also results in incorrect clustering. Furthermore, if a requirement is the perfect matching of a name in a record to an original name, then obtaining efficient clustering is difficult.

To overcome these issues, the inventors have determined, in an inventive moment, to program a normalization process that will apply rigorous, fine-tuned, source-specific data cleaning operations, identify and remove invalid values based on frequency analysis, and cluster records using an orderly process based on exact matches of values of the attributes that remain after invalid values have been removed.

Referring first to FIG. 2, in one embodiment, a computer-implemented process 200 is programmed to obtain access to a plurality of digitally stored company records 202. In some embodiments, the company records 202 are stored in a relational database system and are drawn from a plurality of instance tables or instance databases that correspond to particular enterprises or customers of the system. Thus, while each enterprise or instance locally manages a database or tables, process 200 presumes that some or all of those data records have been copied to, imported into, or otherwise obtained to form the company records 202. In this manner, company records 202 comprise community-based data that reflect suppliers that different enterprises or customers have specified. Users, enterprises, or customers can enter into agreements with the system to supply or allow access to instance-specific data as contributions to community data in company records 202. Furthermore, process 200 typically comprises only one transformation process that acts on company records 202, and a larger system or e-procurement platform can implement other data transforms, analytics, or processing for company records 202 for other purposes.

In an embodiment, process 200 can be programmed to obtain access by programmatically submitting one or more queries to a database server that manages the database. SQL or no-SQL query techniques can be used. In response to one or more queries, process 200 receives one or more result sets of company records 202 to process.

At block 204, process 200 is programmed to execute data cleaning operations on the company records that were received in the result sets. The data cleaning operations result in creating and storing a set of cleaned company records, which can be stored in a different table of the same database or in a different database. In an embodiment, rather than relying on fuzzy matches such as string similarity analysis, embodiments are programmed to execute source-specific data cleaning operations to identify the underlying true name of an entity of a record.

For example, analysis can indicate that certain clients modify the name field, and that only a portion of a value in a name field comprises a company name with other characters that should be removed. In TABLE 1, the supplier name EXT SUPPLIER—COUPA could indicate the use of a pattern in which a true supplier name or portion appears after a dash or hyphen character, allowing the use of software-defined filters to remove those name values while keeping in place valid names that include a dash or hyphen, such as ALCATEL-LUCENT. Regular expressions or regex filters can be used. Furthermore, data cleaning operation at block 204 can be programmed to execute global and region-specific rules for certain types of common words, prefixes and suffixes. For example, when a legal entity definition is identified and isolated correctly, then the true name of the company can be derived. Examples of legal entity definitions are INC, LLC, SARL, BV, and PLC; depending on the country, these values or similar values can appear as a prefix or suffix.

At block 206, process 200 is programmed to execute invalid value filtering of the cleaned company records that were produced by operation 204. In some instances, the data values of records have the correct format but invalid values. In TABLE 1, for example, presuming that a valid format for the Tax ID attribute comprises four digits, "1111" is not the correct Tax ID for ACME SOFTWARE INC.

In an embodiment, invalid value filtering at block 206 is programmed to use frequency analysis techniques to identify values that appear to represent outliers when compared to other records with the same value. For example, for TABLE 1, invalid value filtering at block 206 can be programmed, after name cleaning, to determine that many records have the name COUPA SOFTWARE and the Tax ID of "1111," but only some outliers with different other attributes also have "1111" as Tax ID. One frequency analysis technique could be programmed to identify a value as an outlier if it appears in 10% or fewer of the records; other thresholds could be 25%, 5%, 1%, etc.

The outliers likely are invalid so the invalid value filtering at block 206 can be programmed to mark the outliers as invalid and remove them from consideration to avoid incorrect clustering. In this manner, block 206 can implement frequency analysis as a tactic to identify outliers. Additionally, block 206 can process a fixed list of known invalid tax ID values and/or placeholder values that are regularly seen in data, such as "999999" to indicate an unknown value. The result of invalid value filtering is to change the field value to null, or to a marker value, that causes ignoring the invalid value in later stages of clustering.

At block 208, process 200 is programmed to execute a clustering algorithm 208, using specific operations that are further described in other sections herein. In an embodiment, clustering algorithm 208 is programmed to inspect the data values of all attributes and find matches based on those values, resulting in clusters of records that share matching values. The output of clustering algorithm 208 comprises a plurality of digitally stored clustered output 210 representing clusters of supplier records on a global, system-wide or community-wide basis. Thus, in an embodiment, the clustered output 210 includes records obtained from a plurality of instances of the system for those users, enterprises, customers, or instances that have previously agreed to contribute community data to the system.

The clustered output 210 can be passed to a deduplication program or process to consolidate or remove duplicate records. The clustered output 210 can comprise a plurality of discrete clusters each having an assigned name or identifier; in one embodiment, the name or identifier of a cluster is the most common value of a specified attribute, such as the name attribute, of a record in that cluster. Based upon the structure of the clustering algorithm 208 and the operations of block 204, block 206, the names assigned to clusters have a low likelihood of duplication or collision. TABLE 2 presents an example of the data of Table 1 after clustering:

TABLE 2

DATA AFTER CLUSTERING

| Name | Clean name | Tax ID | Clean tax ID | Cluster identifier |
|---|---|---|---|---|
| Coupa Software Inc | COUPA SOFTWARE | 1111 | 1111 | coupa_software |
| EXT SUPPLIER-Coupa Software | COUPA SOFTWARE | 1111 | 1111 | coupa_software |
| ACME Software Inc | ACME SOFTWARE | 1111 | — | acme_software |
| American Transfer | AMERICAN TRANSFER | 2222 | 2222 | american_transfer |
| American Transfer Inc | AMERICAN TRANSFER | 3333 | 3333 | american_transfer |
| American Transfer Shipping | AMERICAN TRANSFER SHIPPING | 4444 | 4444 | american_transfer_shipping |

In one specific embodiment, process 200 is programmed to read a suppliers_global table of company records 202 as a source or input, cleans the data points used in clustering, executes the clustering algorithm, and outputs a supplier_master table. The schema of the supplier_master table comprises an additional cluster_id column to store a unique name identifying the cluster. The cluster_id is generated for the cluster by calculating the most common name value that appears in the attribute data for all records in a cluster. Process 200 can be configured as a batch job, cron job, or other scheduled job to develop clusters for supplier records periodically, based on instance-specific data tables or global data tables. The period in which the process executes is not critical and different implementations could execute the process daily or nightly, weekly, monthly, or in other periods.

FIG. 1B illustrates an example process of creating and storing digitally stored records in which similar supplier records are clustered. FIG. 3A and FIG. 3B each illustrates hypothetical tables of supplier records, selected steps of an example process for clustering the supplier records, and the effects of applying certain steps. For purposes of illustrating a clear example, the following description explains FIG. 1B generally and with reference to FIG. 3A and FIG. 3B as examples of hypothetical data that could be transformed using the process of FIG. 1B. In general, the example computer-implemented process 100 of FIG. 1B is programmed to first cluster suppliers by name, based on name-based features. Process 100 next is programmed to join probable cluster matches based on the most common value based on the data value of each attribute generated for every cluster. "Most common," in this context, can mean identifying the top-N most common values in the data records referenced in the plurality of clusters, where N is between "1" and "5" and typically "1" or "2".

Each attribute can be associated with a function that is programmed to detect the most common value for that attribute. Thus, an embodiment can include a name function, a tax_id function, an email function, and so forth.

In an embodiment, process 100 is programmed at block 102 to access digitally stored records of a transaction processing system, each of the records comprising data values for a plurality of attributes. For example, server computer 14 transmits one or more queries to company records 202 in a digitally stored database, the queries being formatted to obtain a result set of company records. The number of records requested in a query is not critical and can range from a few dozen to thousands of records depending on the amount of memory available for the in-memory processing of clusters and/or a working dataset. For example, a query could return a result set of 13 records 303 as shown in FIG. 3A, with each of the records 303 having a plurality of attributes 305 and values 302.

At block 104, process 100 is programmed to execute a data cleaning operation by programmatically calling two or more data cleaning functions corresponding to two or more attributes of the records. For example, as seen in FIG. 3A, block 104 can correspond to block 304 and can comprise programmatically calling a BDS name advanced cleanup function, tax ID cleaning function, domain extraction function, and email elimination function. In an embodiment, the records obtained in the result set from the queries of block 102 comprise input, and a working dataset 106 of cleaned records 306 (FIG. 3A) comprises output. In various embodiments, the working dataset 106 can be digitally stored in the main memory of a computer or virtual compute instance that is executing the process, or stored in non-transitory storage such as disk storage, a virtual storage instance, or the same database that holds company records 202. Further, the functions of blocks 104, 304 can operate to submit transformation queries to the working dataset 106 to add a column to the data. As seen in FIG. 3A, in one embodiment, the domain extraction function of block 304 could be programmed to add a domain column 308 and to populate the column with only the domain portion of each email address or website address that is present in the attribute values.

At block 108, process 100 is programmed to cluster records based on exact matches of values of a first attribute, as also shown in block 310 of FIG. 3A. For example, clustering could initially occur based on exact matches of supplier name values. In an embodiment, block 108 causes writing cluster data 120 in the main memory of a computer or virtual compute instance that is executing the process.

FIG. 3B shows an example of a block 312 of the main memory in which the operation of block 310 has written a plurality of clusters 314, each cluster comprising a cluster identifier and a plurality of record identifiers or rowid values 317. Each record identifier serves as a pointer to a record in the working dataset, such as row "7" or row "16" as seen for rowid values 316.

At block 110, process 100 is programmed to join two or more previously formed clusters based on matches of the most common values of one or more other attributes for records in each cluster of the interim clusters. For example, if block 108 forms clusters based on name values, then block 110 could be programmed to join clusters based on matches of the most common tax ID, email address value, domain value, and so forth.

FIG. 3B illustrates an embodiment in which joining clustering executes based on tax ID (block 318), email address value (block 326), and domain value (block 334). Other embodiments could use different attributes, or a different order of matching; for example, internal supplier identifier values also could be used, if present in the data. Referring first to block 318, in one embodiment, joining clustering executes on the basis of exact matches of the most common tax ID value in each of the clusters 314. Block 320 shows a plurality of joined clusters 322. A first one of the joined clusters 322 comprises five (5) row or record identifiers 324 and includes the record identifiers of the first cluster 314 with row or record identifiers 317, as well as two row or record identifiers ("9," "19") that have been joined from another cluster. Thus, block 320 comprises a set of fewer clusters or a reduced, consolidated set of clusters compared to block 312.

Referring now to block 326, in an embodiment, joining clustering next executes on the basis of exact matches of the most common email address value in each cluster of block 320. As a result, with the hypothetical data, block 328 comprises a further reduced plurality of clusters 330, and typically one or more clusters 330 will have a larger number of row or record identifiers 332, based on further joining and consolidation.

As indicated at block 334, in an embodiment, joining clustering next executes on the basis of exact matches of the most common domain value in each cluster of block 328. As a result, with the hypothetical data, block 336 comprises a further reduced plurality of clusters 338, which will be suitable for later processing to deduplicate records.

In each of block 318, 326, 334, constraining the cluster joining to the most common values of a particular attribute reduces the number of clusters that are created and reduces the time required to complete cluster joining. In other embodiments, all the values of an attribute could be considered and matched.

At block 112, process 100 is programmed to update records by adding cluster identifiers to the records. For example, block 112 can comprise performing an update query on the working dataset 106 to add a column attribute for a cluster identifier, and to write the cluster identifiers that have been determined for the interim clusters 120 in memory.

At block 114, process 100 is programmed to optionally write the working dataset 106 to a production database that can be used in other operations such as supplier information management, creating requisitions or purchase orders, payment processing, and so forth. In some embodiments, the working dataset 106 is written back to company records 202. At block 116, process 100 is programmed to return control to a calling process or system, or to end processing.

Numerous applications or services, in an e-procurement system or other systems, can use the data clusters and updated databases that are prepared using the foregoing techniques. For example, in an e-procurement system, deduplicated supplier records prepared after clustering provide a more accurate and normalized target for supplier searches when a buyer is creating a purchase order or requisition, considering consolidating commodities with one supplier, or inviting suppliers to a sourcing event. Additionally, a search for a particular portion of a supplier name could be transformed into a query to the clustered output 210 and return, as search results, a list of all supplier names in the closest matching cluster.

3. IMPLEMENTATION EXAMPLE—HARDWARE OVERVIEW

According to one embodiment, the techniques described herein are implemented by at least one computing device. The techniques may be implemented in whole or in part using a combination of at least one server computer and/or other computing devices that are coupled using a network, such as a packet data network. The computing devices may be hard-wired to perform the techniques, or may include digital electronic devices such as at least one application-specific integrated circuit (ASIC) or field programmable gate array (FPGA) that is persistently programmed to perform the techniques, or may include at least one general purpose hardware processor programmed to perform the techniques pursuant to program instructions in firmware, memory, other storage, or a combination. Such computing devices may also combine custom hard-wired logic, ASICs, or FPGAs with custom programming to accomplish the described techniques. The computing devices may be server computers, workstations, personal computers, portable computer systems, handheld devices, mobile computing devices, wearable devices, body mounted or implantable devices, smartphones, smart appliances, internetworking devices, autonomous or semi-autonomous devices such as robots or unmanned ground or aerial vehicles, any other electronic device that incorporates hard-wired and/or program logic to implement the described techniques, one or more virtual computing machines or instances in a data center, and/or a network of server computers and/or personal computers.

FIG. 5 is a block diagram that illustrates an example computer system with which an embodiment may be implemented. In the example of FIG. 5, a computer system 500 and instructions for implementing the disclosed technologies in hardware, software, or a combination of hardware and software, are represented schematically, for example as boxes and circles, at the same level of detail that is commonly used by persons of ordinary skill in the art to which this disclosure pertains for communicating about computer architecture and computer systems implementations.

Computer system 500 includes an input/output (I/O) subsystem 502 which may include a bus and/or another communication mechanism(s) for communicating information and/or instructions between the components of the computer system 500 over electronic signal paths. The I/O subsystem 502 may include an I/O controller, a memory controller, and at least one I/O port. The electronic signal paths are represented schematically in the drawings, for example as lines, unidirectional arrows, or bidirectional arrows.

At least one hardware processor 504 is coupled to I/O subsystem 502 for processing information and instructions. Hardware processor 504 may include, for example, a general-purpose microprocessor or microcontroller and/or a special-purpose microprocessor such as an embedded system or a graphics processing unit (GPU) or a digital signal processor or ARM processor. Processor 504 may comprise an integrated arithmetic logic unit (ALU) or may be coupled to a separate ALU.

Computer system 500 includes one or more units of memory 506, such as a main memory, which is coupled to I/O subsystem 502 for electronically digitally storing data and instructions to be executed by processor 504. Memory 506 may include volatile memory such as various forms of random-access memory (RAM) or other dynamic storage device. Memory 506 also may be used for storing temporary variables or other intermediate information during execution of instructions to be executed by processor 504. Such instructions, when stored in non-transitory computer-readable storage media accessible to processor 504, can render computer system 500 into a special-purpose machine that is customized to perform the operations specified in the instructions.

Computer system 500 further includes non-volatile memory such as read only memory (ROM) 508 or other static storage device coupled to I/O subsystem 502 for storing information and instructions for processor 504. The ROM 508 may include various forms of programmable ROM (PROM) such as erasable PROM (EPROM) or electrically erasable PROM (EEPROM). A unit of persistent storage 510 may include various forms of non-volatile RAM (NVRAM), such as FLASH memory, or solid-state storage, magnetic disk or optical disk such as CD-ROM or DVD-ROM and may be coupled to I/O subsystem 502 for storing information and instructions. Storage 510 is an example of a non-transitory computer-readable medium that may be used to store instructions and data which when executed by the processor 504 cause performing computer-implemented methods to execute the techniques herein.

The instructions in memory 506, ROM 508 or storage 510 may comprise one or more sets of instructions that are organized as modules, methods, objects, functions, routines, or calls. The instructions may be organized as one or more computer programs, operating system services, or application programs including mobile apps. The instructions may comprise an operating system and/or system software; one or more libraries to support multimedia, programming or other functions; data protocol instructions or stacks to implement TCP/IP, HTTP or other communication protocols; file format processing instructions to parse or render files coded using HTML, XML, JPEG, MPEG or PNG; user interface instructions to render or interpret commands for a graphical user interface (GUI), command-line interface or text user interface; application software such as an office suite, internet access applications, design and manufacturing applications, graphics applications, audio applications, software engineering applications, educational applications, games or miscellaneous applications. The instructions may implement a web server, web application server or web client. The instructions may be organized as a presentation layer, application layer and data storage layer such as a relational database system using structured query language (SQL) or no SQL, an object store, a graph database, a flat file system or other data storage.

Computer system 500 may be coupled via I/O subsystem 502 to at least one output device 512. In one embodiment, output device 512 is a digital computer display. Examples of a display that may be used in various embodiments include a touch screen display or a light-emitting diode (LED) display or a liquid crystal display (LCD) or an e-paper display. Computer system 500 may include other type(s) of output devices 512, alternatively or in addition to a display device. Examples of other output devices 512 include printers, ticket printers, plotters, projectors, sound cards or video cards, speakers, buzzers or piezoelectric devices or other audible devices, lamps or LED or LCD indicators, haptic devices, actuators or servos.

At least one input device 514 is coupled to I/O subsystem 502 for communicating signals, data, command selections or gestures to processor 504. Examples of input devices 514 include touch screens, microphones, still and video digital cameras, alphanumeric and other keys, keypads, keyboards, graphics tablets, image scanners, joysticks, clocks, switches, buttons, dials, slides, and/or various types of sensors such as force sensors, motion sensors, heat sensors, accelerometers, gyroscopes, and inertial measurement unit (IMU) sensors and/or various types of transceivers such as wireless, such as cellular or Wi-Fi, radio frequency (RF) or infrared (IR) transceivers and Global Positioning System (GPS) transceivers.

Another type of input device is a control device 516, which may perform cursor control or other automated control functions such as navigation in a graphical interface on a display screen, alternatively or in addition to input functions. Control device 516 may be a touchpad, a mouse, a trackball, or cursor direction keys for communicating direction information and command selections to processor 504 and for controlling cursor movement on display 512. The input device may have at least two degrees of freedom in two axes, a first axis (e.g., x) and a second axis (e.g., y), that allows the device to specify positions in a plane. Another type of input device is a wired, wireless, or optical control device such as a joystick, wand, console, steering wheel, pedal, gearshift mechanism or other type of control device. An input device 514 may include a combination of multiple different input devices, such as a video camera and a depth sensor.

In another embodiment, computer system 500 may comprise an internet of things (IoT) device in which one or more of the output device 512, input device 514, and control device 516 are omitted. Or, in such an embodiment, the input device 514 may comprise one or more cameras, motion detectors, thermometers, microphones, seismic detectors, other sensors or detectors, measurement devices or encoders and the output device 512 may comprise a special-purpose display such as a single-line LED or LCD display, one or more indicators, a display panel, a meter, a valve, a solenoid, an actuator or a servo.

When computer system 500 is a mobile computing device, input device 514 may comprise a global positioning system (GPS) receiver coupled to a GPS module that is capable of triangulating to a plurality of GPS satellites, determining and generating geo-location or position data such as latitude-longitude values for a geophysical location of the computer system 500. Output device 512 may include hardware, software, firmware and interfaces for generating position reporting packets, notifications, pulse or heartbeat signals, or other recurring data transmissions that specify a position of the computer system 500, alone or in combination with other application-specific data, directed toward host 524 or server 530.

Computer system 500 may implement the techniques described herein using customized hard-wired logic, at least one ASIC or FPGA, firmware and/or program instructions or logic which when loaded and used or executed in combination with the computer system causes or programs the computer system to operate as a special-purpose machine. According to one embodiment, the techniques herein are performed by computer system 500 in response to processor 504 executing at least one sequence of at least one instruction contained in main memory 506. Such instructions may be read into main memory 506 from another storage medium, such as storage 510. Execution of the sequences of instructions contained in main memory 506 causes processor 504 to perform the process steps described herein. In alternative embodiments, hard-wired circuitry may be used in place of or in combination with software instructions.

The term "storage media" as used herein refers to any non-transitory media that store data and/or instructions that cause a machine to operation in a specific fashion. Such storage media may comprise non-volatile media and/or volatile media. Non-volatile media includes, for example, optical or magnetic disks, such as storage 510. Volatile media includes dynamic memory, such as memory 506. Common forms of storage media include, for example, a hard disk, solid state drive, flash drive, magnetic data storage medium, any optical or physical data storage medium, memory chip, or the like.

Storage media is distinct from but may be used in conjunction with transmission media. Transmission media participates in transferring information between storage media. For example, transmission media includes coaxial cables, copper wire and fiber optics, including the wires that comprise a bus of I/O subsystem 502. Transmission media can also take the form of acoustic or light waves, such as those generated during radio-wave and infra-red data communications.

Various forms of media may be involved in carrying at least one sequence of at least one instruction to processor 504 for execution. For example, the instructions may initially be carried on a magnetic disk or solid-state drive of a remote computer. The remote computer can load the instructions into its dynamic memory and send the instructions over a communication link such as a fiber optic or coaxial cable or telephone line using a modem. A modem or router local to computer system 500 can receive the data on the communication link and convert the data to a format that can be read by computer system 500. For instance, a receiver such as a radio frequency antenna or an infrared detector can receive the data carried in a wireless or optical signal and appropriate circuitry can provide the data to I/O subsystem 502 such as place the data on a bus. I/O subsystem 502 carries the data to memory 506, from which processor 504 retrieves and executes the instructions. The instructions received by memory 506 may optionally be stored on storage 510 either before or after execution by processor 504.

Computer system 500 also includes a communication interface 518 coupled to bus of I/O subsystem 502. Communication interface 518 provides a two-way data communication coupling to network link(s) 520 that are directly or indirectly connected to at least one communication networks, such as a network 522 or a public or private cloud on the Internet. For example, communication interface 518 may be an Ethernet networking interface, integrated-services digital network (ISDN) card, cable modem, satellite modem, or a modem to provide a data communication connection to a corresponding type of communications line, for example an Ethernet cable or a metal cable of any kind or a fiber-optic line or a telephone line. Network 522 broadly represents a local area network (LAN), wide-area network (WAN), campus network, internetwork or any combination thereof. Communication interface 518 may comprise a LAN card to provide a data communication connection to a compatible LAN, or a cellular radiotelephone interface that is wired to send or receive cellular data according to cellular radiotelephone wireless networking standards, or a satellite radio interface that is wired to send or receive digital data according to satellite wireless networking standards. In any such implementation, communication interface 518 sends and receives electrical, electromagnetic or optical signals over signal paths that carry digital data streams representing various types of information.

Network link 520 typically provides electrical, electromagnetic, or optical data communication directly or through at least one network to other data devices, using, for example, satellite, cellular, Wi-Fi, or BLUETOOTH technology. For example, network link 520 may provide a connection through a network 522 to a host computer 524.

Furthermore, network link 520 may provide a connection through network 522 or to other computing devices via internetworking devices and/or computers that are operated by an Internet Service Provider (ISP) 526. ISP 526 provides data communication services through a world-wide packet data communication network represented as internet 528. A server computer 530 may be coupled to internet 528. Server 530 broadly represents any computer, data center, virtual machine or virtual computing instance with or without a hypervisor, or computer executing a containerized program system such as DOCKER or KUBERNETES. Server 530 may represent an electronic digital service that is implemented using more than one computer or instance and that is accessed and used by transmitting web services requests, uniform resource locator (URL) strings with parameters in HTTP payloads, API calls, app services calls, or other service calls. Computer system 500 and server 530 may form elements of a distributed computing system that includes other computers, a processing cluster, server farm or other organization of computers that cooperate to perform tasks or execute applications or services. Server 530 may comprise one or more sets of instructions that are organized as modules, methods, objects, functions, routines, or calls. The instructions may be organized as one or more computer programs, operating system services, or application programs including mobile apps. The instructions may comprise an operating system and/or system software; one or more libraries to support multimedia, programming or other functions; data protocol instructions or stacks to implement TCP/IP, HTTP or other communication protocols; file format processing instructions to parse or render files coded using HTML, XML, JPEG, MPEG or PNG; user interface instructions to render or interpret commands for a graphical user interface (GUI), command-line interface or text user interface; application software such as an office suite, internet access applications, design and manufacturing applications, graphics applications, audio applications, software engineering applications, educational applications, games or miscellaneous applications. Server 530 may comprise a web application server that hosts a presentation layer, application layer and data storage layer such as a relational database system using structured query language (SQL) or no SQL, an object store, a graph database, a flat file system or other data storage.

Computer system 500 can send messages and receive data and instructions, including program code, through the network(s), network link 520 and communication interface 518. In the Internet example, a server 530 might transmit a requested code for an application program through Internet 528, ISP 526, local network 522 and communication interface 518. The received code may be executed by processor 504 as it is received, and/or stored in storage 510, or other non-volatile storage for later execution.

The execution of instructions as described in this section may implement a process in the form of an instance of a computer program that is being executed, and consisting of program code and its current activity. Depending on the operating system (OS), a process may be made up of multiple threads of execution that execute instructions concurrently. In this context, a computer program is a passive collection of instructions, while a process may be the actual execution of those instructions. Several processes may be associated with the same program; for example, opening up several instances of the same program often means more than one process is being executed. Multitasking may be implemented to allow multiple processes to share processor 504. While each processor 504 or core of the processor executes a single task at a time, computer system 500 may be programmed to implement multitasking to allow each processor to switch between tasks that are being executed without having to wait for each task to finish. In an embodiment, switches may be performed when tasks perform input/output operations, when a task indicates that it can be switched, or on hardware interrupts. Time-sharing may be implemented to allow fast response for interactive user applications by rapidly performing context switches to provide the appearance of concurrent execution of multiple processes simultaneously. In an embodiment, for security and reliability, an operating system may prevent direct communication between independent processes, providing strictly mediated and controlled inter-process communication functionality.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A computer-implemented method, comprising:
    using a normalization service of a first application virtual compute instance hosted in and executing in a cloud computing facility, accessing a plurality of digitally stored data records of a transaction processing system, each of the data records comprising a plurality of data values for a corresponding plurality of attributes;
    using the normalization service, executing a data cleaning operation on the data records by programmatically calling two or more data cleaning functions, each of the data cleaning functions corresponding to a particular attribute among the plurality of attributes;
    using the normalization service, creating and storing a plurality of clusters in memory of the first application virtual compute instance by clustering the data records based on exact matches of the data values of a first attribute and creating and storing references to the data records in the clusters;
    using the normalization service, joining two or more clusters among the plurality of the clusters in the memory to produce two or more joined clusters based on matches of most common values in the data records referenced in the plurality of clusters;
    updating the data records by adding cluster identifiers of the joined clusters.

2. The computer-implemented method of claim 1, wherein the first application virtual compute instance is communicatively coupled to a first virtual storage instance that hosts a community database, the method further comprising:
    executing, in the cloud computing facility, a plurality of second application virtual compute instances corresponding to a plurality of different tenants of the transaction processing system, each second application virtual compute instance among the plurality of second application virtual compute instances being communicatively coupled to a particular virtual storage instance among a plurality of virtual storage instances in the cloud computing facility, each of the virtual storage instances being configured to store instance-specific data corresponding to a particular tenant of the corresponding second application virtual compute instance;
    using the first virtual compute instance, querying each of the virtual storage instances among the plurality of virtual storage instances to obtain the instance-specific data of all the tenants;
    using the first virtual compute instance, combining and storing copies of the instance-specific data corresponding to the tenants in company records of the community database.

3. The computer-implemented method of claim 1, wherein the updating comprises adding a cluster identifier column attribute to the data records and storing the cluster identifiers in the cluster identifier column attribute.

4. The computer-implemented method of claim 1, the transaction processing system comprising an e-procurement system, the data records comprising supplier records, each of the supplier records having the data values for at least a supplier name attribute, a tax identifier attribute, an email address attribute.

5. The computer-implemented method of claim 4, further comprising, using the normalization service, executing the data cleaning operation on the data records by programmatically calling a supplier name cleaning function that is programmed to clean data values of the supplier name attribute, programmatically calling a tax identifier cleaning function that is programmed to clean data values of the tax identifier attribute, and programmatically calling an email address cleaning function that is programmed to clean data values of the email address attribute.

6. The computer-implemented method of claim 4, further comprising:
    using the normalization service, executing the data cleaning operation on the data records by programmatically calling a supplier name cleaning function that is programmed to clean data values of the supplier name attribute and programmatically calling a tax identifier cleaning function that is programmed to clean data values of the tax identifier attribute;
    using the normalization service, executing an invalid value filtering operation on the data records to remove at least invalid values of the tax identifier attribute.

7. The computer-implemented method of claim 6, further comprising, using the normalization service, executing the invalid value filtering operation on the data records to remove at least invalid values of the tax identifier attribute via frequency analysis and identifying outliers.

8. The computer-implemented method of claim 1, further comprising, using the normalization service, joining the two or more clusters among the plurality of the clusters in the memory to produce the two or more joined clusters based on matches of a top-N most common values in the data records referenced in the plurality of clusters, where N is between "1" and "5".

9. The computer-implemented method of claim 2, further comprising:
using the normalization service, updating the data records and the joined clusters in the community database;
using a supplier search service executed using the first virtual compute instance, receiving a search query that specifies a target supplier name;
using the supplier search service, executing the search query against the community database to return a result set comprising the data records referenced in a particular joined cluster that matches the search query;
using the supplier search service, formatting and transmitting, to a user computer, presentation instructions which when rendered using the user computer cause displaying the data values of the attributes of the data records referenced in a particular joined cluster that matches the search query.

10. One or more non-transitory computer-readable storage media storing one or more sequences of instructions which, when executed using one or more processors, cause the one or more processors to execute:
using a normalization service of a first application virtual compute instance hosted in and executing in a cloud computing facility, accessing a plurality of digitally stored data records of a transaction processing system, each of the data records comprising a plurality of data values for a corresponding plurality of attributes;
using the normalization service, executing a data cleaning operation on the data records by programmatically calling two or more data cleaning functions, each of the data cleaning functions corresponding to a particular attribute among the plurality of attributes;
using the normalization service, creating and storing a plurality of clusters in memory of the first application virtual compute instance by clustering the data records based on exact matches of the data values of a first attribute and creating and storing references to the data records in the clusters;
using the normalization service, joining two or more clusters among the plurality of the clusters in the memory to produce two or more joined clusters based on matches of most common values in the data records referenced in the plurality of clusters;
updating the data records by adding cluster identifiers of the joined clusters.

11. The one or more non-transitory computer-readable storage media of claim 10, wherein the first application virtual compute instance is communicatively coupled to a first virtual storage instance that hosts a community database, and further comprising one or more sequences of instructions which, when executed using the one or more processors, cause the one or more processors to execute:
executing, in the cloud computing facility, a plurality of second application virtual compute instances corresponding to a plurality of different tenants of the transaction processing system, each second application virtual compute instance among the plurality of second application virtual compute instances being communicatively coupled to a particular virtual storage instance among a plurality of virtual storage instances in the cloud computing facility, each of the virtual storage instances being configured to store instance-specific data corresponding to a particular tenant of the corresponding second application virtual compute instance;
using the first virtual compute instance, querying each of the virtual storage instances among the plurality of virtual storage instances to obtain the instance-specific data of all the tenants;
using the first virtual compute instance, combining and storing copies of the instance-specific data corresponding to the tenants in company records of the community database.

12. The one or more non-transitory computer-readable storage media of claim 10, wherein the instructions for the updating further comprise one or more sequences of instructions which, when executed using the one or more processors, cause the one or more processors to execute adding a cluster identifier column attribute to the data records and storing the cluster identifiers in the cluster identifier column attribute.

13. The one or more non-transitory computer-readable storage media of claim 10, the transaction processing system comprising an e-procurement system, the data records comprising supplier records, each of the supplier records having the data values for at least a supplier name attribute, a tax identifier attribute, an email address attribute.

14. The one or more non-transitory computer-readable storage media of claim 13, further comprising one or more sequences of instructions which, when executed using the one or more processors, cause the one or more processors to execute, using the normalization service, executing the data cleaning operation on the data records by programmatically calling a supplier name cleaning function that is programmed to clean data values of the supplier name attribute, programmatically calling a tax identifier cleaning function that is programmed to clean data values of the tax identifier attribute, and programmatically calling an email address cleaning function that is programmed to clean data values of the email address attribute.

15. The one or more non-transitory computer-readable storage media of claim 13, further comprising one or more sequences of instructions which, when executed using the one or more processors, cause the one or more processors to execute:
using the normalization service, executing the data cleaning operation on the data records by programmatically calling a supplier name cleaning function that is programmed to clean data values of the supplier name attribute and programmatically calling a tax identifier cleaning function that is programmed to clean data values of the tax identifier attribute;
using the normalization service, executing an invalid value filtering operation on the data records to remove at least invalid values of the tax identifier attribute.

16. The one or more non-transitory computer-readable storage media of claim 15, further comprising one or more sequences of instructions which, when executed using the one or more processors, cause the one or more processors to execute, using the normalization service, executing the invalid value filtering operation on the data records to remove at least invalid values of the tax identifier attribute via frequency analysis and identifying outliers.

17. The one or more non-transitory computer-readable storage media of claim 10, further comprising one or more sequences of instructions which, when executed using the one or more processors, cause the one or more processors to execute, using the normalization service, joining the two or more clusters among the plurality of the clusters in the memory to produce the two or more joined clusters based on matches of a top-N most common values in the data records referenced in the plurality of clusters, where N is between "1" and "5".

18. The one or more non-transitory computer-readable storage media of claim 11, further comprising one or more sequences of instructions which, when executed using the one or more processors, cause the one or more processors to execute:
    using the normalization service, updating the data records and the joined clusters in the community database;
    using a supplier search service executed using the first virtual compute instance, receiving a search query that specifies a target supplier name;
    using the supplier search service, executing the search query against the community database to return a result set comprising the data records referenced in a particular joined cluster that matches the search query;
    using the supplier search service, formatting and transmitting, to a user computer, presentation instructions which when rendered using the user computer cause displaying the data values of the attributes of the data records referenced in a particular joined cluster that matches the search query.

* * * * *